United States Patent
McCoy et al.

(10) Patent No.: US 7,469,020 B2
(45) Date of Patent: Dec. 23, 2008

(54) SYSTEMS, METHODS, AND APPARATUS FOR REDUCING DYNAMIC RANGE REQUIREMENTS OF A POWER AMPLIFIER IN A WIRELESS DEVICE

(75) Inventors: James Wesley McCoy, Austin, TX (US); Kevin B. Traylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 669 days.

(21) Appl. No.: 11/114,366

(22) Filed: Apr. 26, 2005

(65) Prior Publication Data

US 2006/0239377 A1 Oct. 26, 2006

(51) Int. Cl.
*H04K 1/02* (2006.01)

(52) U.S. Cl. ............ 375/296; 375/254; 375/261; 375/266; 375/271; 375/278; 375/284; 375/285; 375/297; 375/298; 375/300; 375/302

(58) Field of Classification Search ............ 375/296, 375/254, 261, 268, 271, 278, 284, 285, 297, 375/298, 300, 302
See application file for complete search history.

(56) References Cited

U.S. PATENT DOCUMENTS

| 5,638,403 | A | 6/1997 | Birchler et al. |
| 6,147,984 | A | 11/2000 | McCoy et al. |
| 2004/0052314 | A1* | 3/2004 | Copeland .................. 375/296 |

FOREIGN PATENT DOCUMENTS

EP     1 253 757  A1   10/2002

* cited by examiner

*Primary Examiner*—Kabir A Timory
(74) *Attorney, Agent, or Firm*—Dillon & Yudell LLP

(57) ABSTRACT

Systems, methods, and apparatus for reducing dynamic range requirements of a power amplifier in a wireless device are provided. An exemplary method may include modulating a symbol stream to generate a modulated waveform. The exemplary method may further include generating at least one pulse having a peak aligned with an anticipated position of a peak or a null corresponding to the modulated waveform, where the anticipated position of the a peak or the null corresponding to modulated waveform may be determined by detecting a transition in a phase or an amplitude of the modulated waveform.

20 Claims, 7 Drawing Sheets

SYSTEMS, METHODS, AND APPARATUS FOR REDUCING DYNAMIC RANGE REQUIREMENTS OF A POWER AMPLIFIER IN A WIRELESS DEVICE

TECHNICAL FIELD

The present invention relates to wireless devices and, in particular, to systems, methods, and apparatus for reducing dynamic range requirements of a power amplifier in a wireless device.

BACKGROUND OF THE INVENTION

Wireless devices increasingly use complex modulation schemes, such as phase-shift-keying (PSK) to modulate voice, data, or other input information. For example, to support higher data rates, GSM-based wireless devices now support 8-PSK modulation scheme to modulate a signal that may convey the input information. Regardless, such wireless devices use power amplifiers to amplify signals, which then can be transmitted using an appropriate antenna.

Among other design constraints, power amplifiers should be designed to avoid distortion particularly at the extremes of the dynamic range of such amplifiers. Linearly modulated signals have dynamic range requirements that, among other things, depend upon the number of codes (users). Peaks or nulls may occur in such wireless devices when individual carriers (codes) are phase aligned. With the increasing number of carriers or codes being used in such devices, the probability of peaks and nulls occurring has gone up in such devices. This places high peak-power requirements on the power amplifiers used in such wireless devices.

To reduce the peak-power requirements on a power amplifier, typically either the average power or peak-to-average ratio may be lowered. Often, the wireless system link budget determines the average power, and thus the average power cannot be lowered that easily. Accordingly, when the average power cannot be changed, one possibility is to reduce the peaks, i.e., reduce the peak-to-average ratio, using measurement based systems, such as feed-back or feed-forward systems.

Such systems, however, typically require complex measurements associated with either determining an appropriate feed-back signal or a feed-forward signal, which then may be fed to the power amplifier. Further, such techniques may result in adverse effects on a wireless device's system parameters, such as bit-error rate and/or vector error. Accordingly, there is a need for systems, methods, and apparatus for reducing dynamic range requirements of a power amplifier in a wireless device.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE EMBODIMENTS

Figure 1:
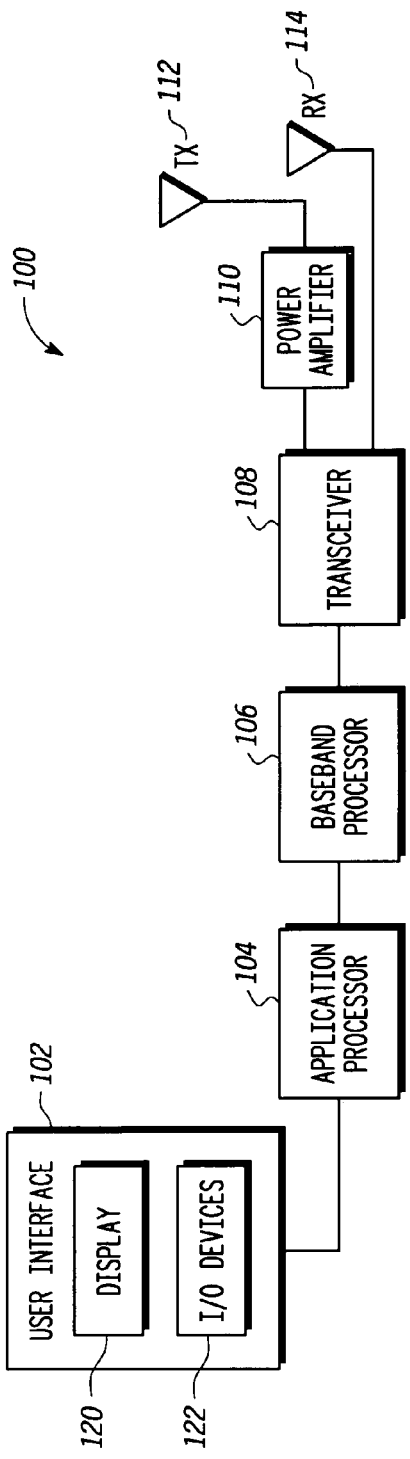
FIG. 1 is a block diagram showing a wireless device, consistent with embodiments of the invention.

Consistent with embodiments of the invention, systems, methods, and apparatus for reducing dynamic range requirements of a power amplifier in a wireless device are provided. By way of a non-limiting example, dynamic range requirements of the power amplifier may be reduced using an exemplary method for generating a pulse. The exemplary method may include modulating a symbol stream to generate a modulated waveform. The exemplary method may further include generating at least one pulse having a peak aligned with an anticipated position of a peak or a null corresponding to the modulated waveform, where the anticipated position of the peak or the null corresponding to the modulated waveform may be determined by detecting a transition in a phase or an amplitude of the modulated waveform. As used herein, the term "waveform" includes both a single waveform and multiple waveforms or any combination thereof. Further, consistent with the various embodiments of the invention, the term "anticipated position" includes, but is not limited to, the most likely instant at which a peak or a null of a waveform may occur.

In another embodiment of the invention, a wireless device comprising a modulator for modulating a symbol stream to generate a modulated waveform based on at least one modulation technique is provided. The wireless device may further include a pulse insertion logic module for detecting a critical transition in the modulated waveform corresponding to the at least one modulation technique. The wireless device may further include a pulse generator for generating at least one pulse having a peak aligned with an anticipated position of a peak or a null corresponding to the modulated waveform, wherein the anticipated position of the peak or the null corresponding to the modulated waveform is determined by detecting the critical transition with respect to a phase or an amplitude of the modulated waveform.

In yet another embodiment of the invention, a wireless device comprising a waveform logic module for modulating a symbol stream to generate a modulated waveform is provided. The wireless device may further include a critical transition detector for detecting a critical transition in the modulated waveform, wherein the critical transition detector accesses a look-up table storing information concerning at least one set of critical transitions related to the modulated waveform, wherein the set of critical transitions comprises at least one transition from a first constellation point to a second constellation point corresponding to the modulated waveform, such that the at least one transition passes near a center or a periphery of a constellation diagram corresponding to the modulated waveform. The wireless device may further include a pulse generator for generating at least one pulse having a peak aligned with an anticipated position of a peak or a null corresponding to the modulated waveform, wherein the anticipated position corresponds to a point half-way between the first constellation point and the second constellation point.

The features of the present invention may be implemented in various wireless environments to reduce dynamic range requirements of a power amplifier. Such environments and applications may be specially constructed for performing the various processes and operations of the invention or they may include a general-purpose computer or computing platform selectivity activated or reconfigured by program code to provide the necessary functionality. The methods disclosed herein are not inherently related to any particular computer, processor, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

FIG. 1 is a block diagram showing a wireless device, consistent with one embodiment of the invention. As shown in FIG. 1, an exemplary wireless device 100 may include a user interface 102, an application processor 104, a baseband processor 106, a transceiver 108, a power amplifier 110, a transmit antenna 112 and a receive antenna 114. User interface 102 may further include a display 120 and I/O devices 122. User interface 102 may enable a user to interact with wireless device 100. Thus, for example the user may view information on display 120 and input information or receive information via I/O devices 122. I/O devices 122 may include voice, text, video devices or other types of devices for communication using wireless device 100. Application processor 104 may enable wireless device 100 to execute any applications, such as voice and/or data related applications. In one embodiment, application processor 104 may be implemented by using i.MX21 processor available from FREESCALE™ Semiconductor, Inc. of Austin, Tex. Baseband processor 106 may perform baseband processing, including channel encoding and decoding to enable wireless device 100 to communicate with other devices. By way of a non-limiting example, baseband processor 106 may be implemented using DSP56621 processor available from FREESCALE™ Semiconductor, Inc. of Austin, Tex. Transceiver 108 may enable wireless device 100 to transmit and receive information. By way of a non-limiting example, transceiver 108 may be implemented using MC13712 RF transceiver available from FREESCALE™ Semiconductor, Inc. of Austin, Tex. Power amplifier 110 may amplify signals for transmission using transmit antenna Tx 112. By way of a non-limiting example, power amplifier 110 may be implemented using PA MMM6010 available from FREESCALE™ Semiconductor, Inc. of Austin, Tex. Signals may be received wirelessly through receive antenna Rx 114. Although specific examples of various components of wireless device 100 are provided, other similar components may be used consistent with various embodiments of the invention. Moreover, consistent with embodiments of the invention, wireless device 100 may be configured as part of a mobile handset, a personal digital assistant, a base station controller, or as part of any wireless device that may need to transmit signals using any linear modulation technique.

Although FIG. 1 shows several components arranged in a particular manner to provide functionality associated with wireless device 100, this arrangement and the selection of components is merely exemplary. Indeed, the foregoing discussion is intended to introduce and provide initial clarity for some of the aspects associated with the present invention by referring to the exemplary embodiment depicted in FIG. 1. Further details of this embodiment as well as additional aspects and embodiments of the present invention will be described in the following discussion. However, it is to be understood that other alternative embodiments may be utilized and that structural and method changes may be made without departing from the scope of present invention. The foregoing and following discussion are, therefore, not to be construed in a limiting sense.

Figure 2:
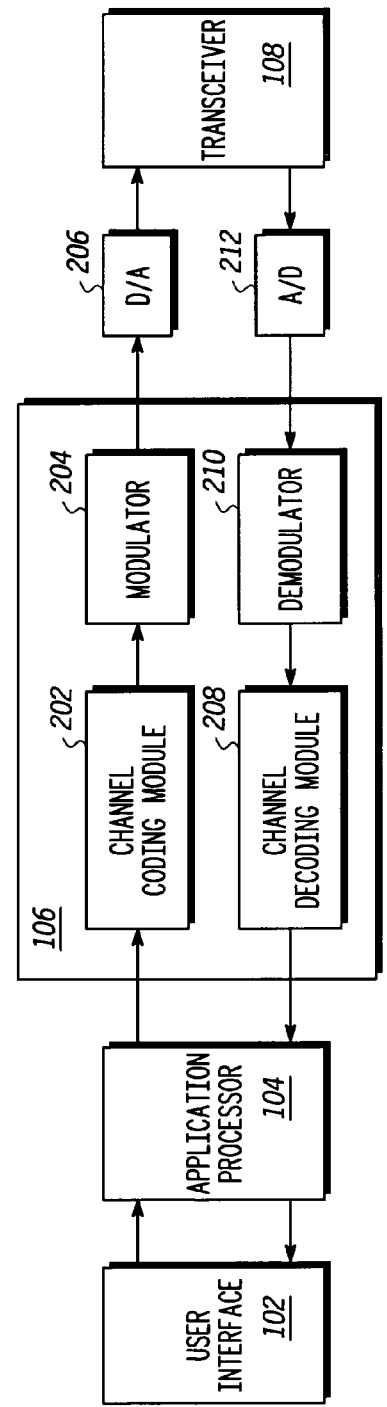
FIG. 2 is a block diagram showing additional details of a wireless device, consistent with embodiments of the invention.

As shown in FIG. 2, wireless device 100 may include additional components, such as a digital to analog (D/A) 206 and an analog to digital (A/D) 212 converter. Baseband processor 106 may include a channel coding module 202 and a modulator 204. Baseband processor 106 may further include a channel decoding module 208 and a demodulator 210. Although FIG. 2 shows specific components arranged in a particular manner, these may be arranged in any suitable fashion and may include additional or fewer components.

Figure 3:
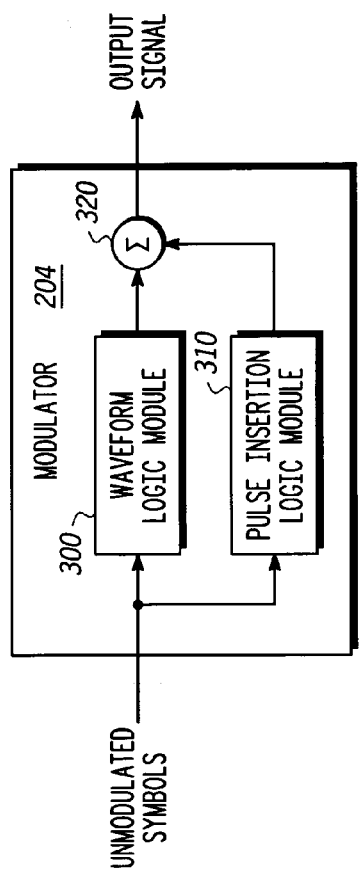
FIG. 3 is a block diagram of a system for generating a pulse, consistent with embodiments of the invention.

As shown in FIG. 3, by way of a non-limiting example, a system for generating a pulse 300 may include a modulator 204, a pulse insertion logic module 310, and a summer 320. System 300 may receive information in the form of a stream of symbols. Thus, for example, input information received via user interface 102 of FIG. 1 may be represented by a stream of symbols. The input stream of symbols may represent information, such as, text, audio, video, or any combination thereof. The input stream of symbols may be split by using a power splitter, (not shown) such as a directional coupler, for example. The split inputs may be combined using summer 320, for example. The output signal from system 300 may then be fed to power amplifier (110 of FIG. 1, for example). For clarity of explanation, the functionality of the mechanisms described herein is distinguished. However, it is to be understood that, in operation, the functionality of these mechanisms may differ from what is described. For example, the mechanisms may be separate, each residing at different locations, or they may be integrated into one device residing at a common location.

Figure 4:
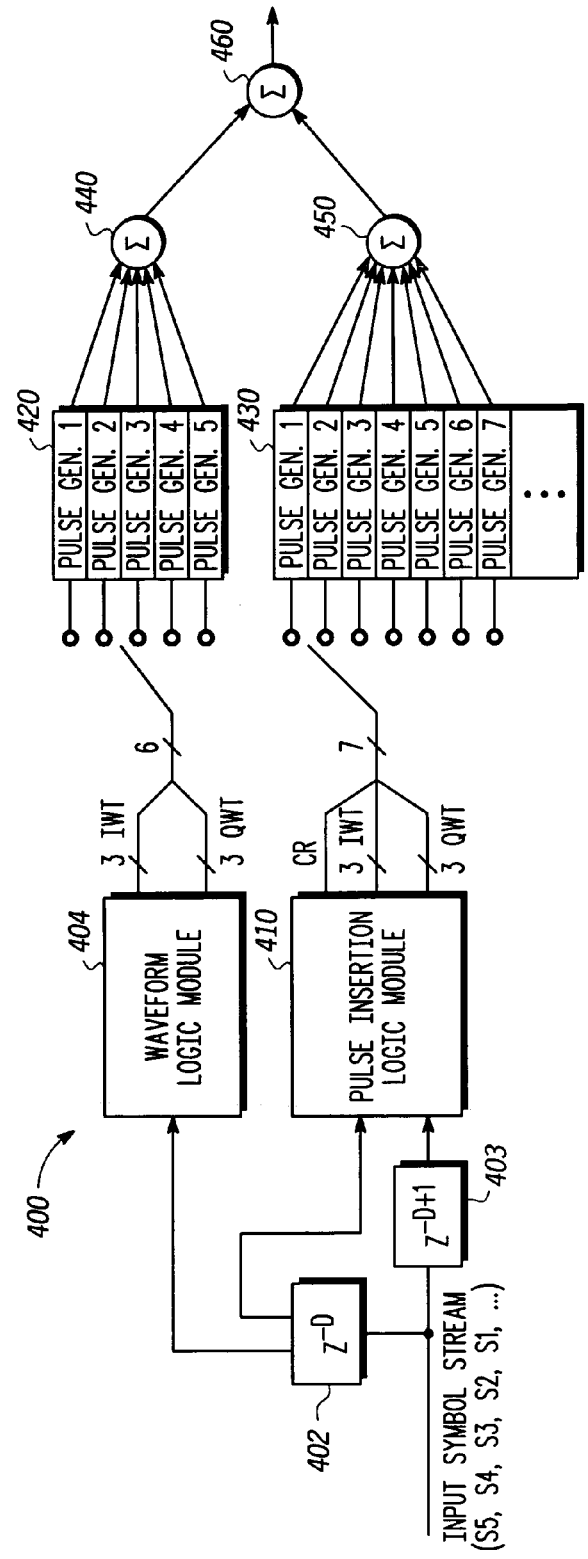
FIG. 4 is a detailed block diagram of a system for generating a pulse, consistent with embodiments of the invention.

FIG. 4 is a detailed block diagram of a system 400 for generating a pulse, consistent with another embodiment of the invention. In one embodiment, system 400 may be implemented as part of modulator 204 (FIG. 2). System 400 may include delay elements 402 and 403, a waveform logic module 404, a pulse insertion logic module 410, a set of pulse generators (420 and 430) and summers (440, 450, and 460). Delay element 402 may be used for delaying an input symbol stream (represented by an input waveform) before it is fed to waveform logic module 404. Delay element 403 may be used for delaying the input symbol stream before it is fed to pulse insertion logic module 410. In one embodiment, delay element 403 may delay the symbol stream by one additional symbol length before the symbol stream is fed to pulse insertion logic module 410. Delay elements 402 and 403 may be implemented using a shift register or a similar memory element. Waveform logic module 404 may output both in-phase (I) and quadrature (Q) components. By way of a non-limiting example, the input symbol stream may comprise three-bit symbols. Thus, each of symbols S5, S4, S3, S2, S1 . . . may be a three-bit symbol. Although not shown in FIG. 4, the input symbol stream may be split using a splitter into two paths.

Pulse insertion logic module 410 may be arranged in a path parallel to waveform logic module 404. Pulse insertion logic module 410 may also output both in-phase (I) and quadrature (Q) components. In addition, pulse insertion logic module 410 may output a critical transition detection bit (CR), which may have two possible values (0 or 1, for example). In one embodiment, pulse insertion logic module 410 may set the CR bit to 1 if by comparing two successive symbols in the input symbol stream it detects a critical transition. Alternatively, CR bit may be set to a value of 0. CR bit value may control when a pulse is generated by a pulse generator, such as pulse generator 430. In addition, by using a look-up table (or tables) pulse insertion logic module 410 may specify an amplitude, a shape, and timing of insertion of the pulse. Output from pulse generators 420 and 430 may be summed using summers 440, 450, and 460 to generate an output waveform, which then may be fed to a power amplifier (not shown in FIG. 4).

Figure 5:
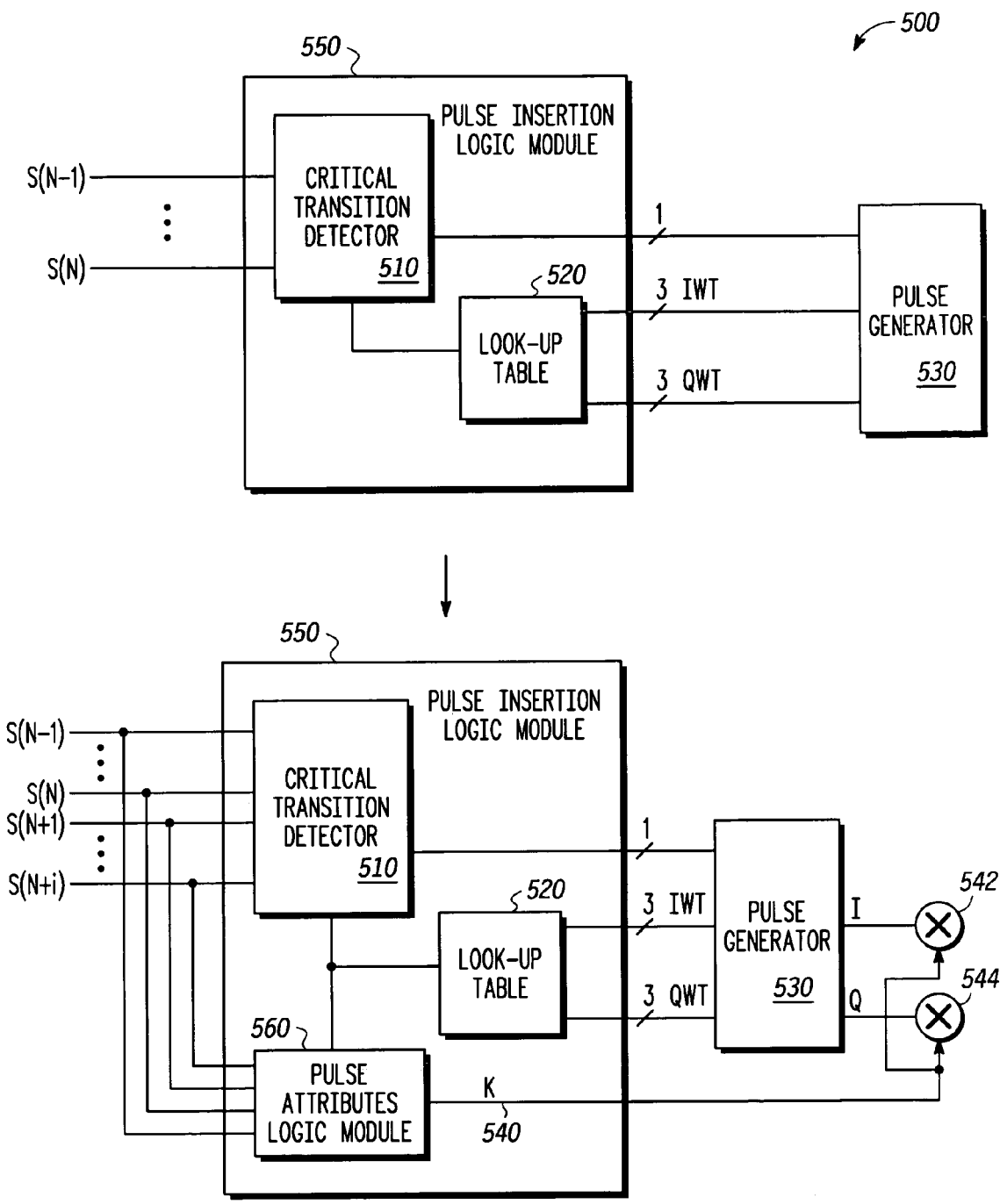
FIG. 5 is a block diagram showing exemplary embodiments of pulse insertion logic modules and pulse generators, consistent with embodiments of the invention.
Figure 6:
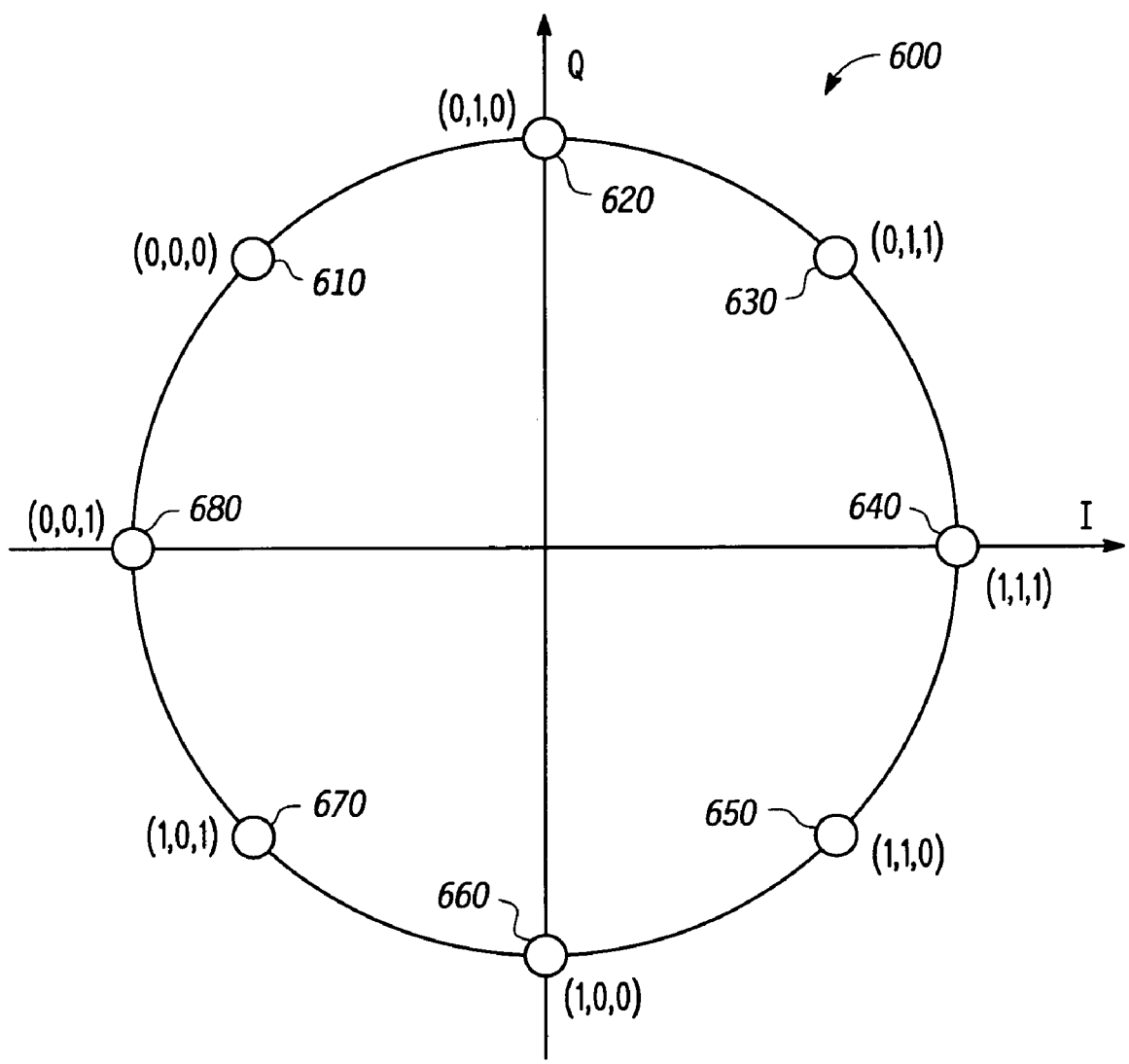
FIG. 6 is a constellation points diagram showing various constellation points corresponding to a modulated waveform.

FIG. 5 is a block diagram of two exemplary embodiments of a pulse insertion logic module, consistent with embodiments of the invention. By way of a non-limiting example, a first exemplary pulse insertion logic module 550 may include a critical transition detector 510 and a look-up table 520. Critical transition detector 510 may be a processor that can access look-up table 520 and detect a critical transition. A critical transition may relate to a transition that results in a pre-defined change in value in terms of a phase and/or an amplitude of an input waveform representing the stream of symbols, for example. Thus, for example, referring to FIG. 6, which shows constellation points 610, 620, 630, 640, 650, 660, 670, and 680 corresponding to a 8-PSK modulated waveform, critical transition detector may detect a transition between any of these points. Input information represented by three-bit symbols may correspond to any of the eight constellation points representative of the phase of the waveform. Thus, for example, as shown in FIG. 6, constellation point 610 may relate to a three-bit symbol value of 000. Input information (e.g. represented by three-bit symbols) thus may be represented by the phase of the waveform. Although not shown in FIG. 6, input information may be represented by an amplitude of a waveform. Consistent with embodiments of the invention, input symbols may be represented by using B-PSK, QAM, or any other modulation technique, including but not limited to any linear modulation technique.

Referring still to FIG. 5, another exemplary pulse insertion logic module 550 is shown. Pulse insertion logic module 550 may include critical transition detector 510, look-up table 520, and a pulse attributes logic module 560. Critical transition detector 510, look-up table 520, and pulse generator 530 may provide similar functionality, as discussed above with respect to the first embodiment of pulse insertion logic module 550. In one embodiment, at least one pulse generated by pulse generator may be dynamically scaled. Dynamic scaling may be achieved by feeding at least two successive symbols to critical transition detector 510, which may access look-up table 520 and determine an appropriate strength of the pulse. As part of this process, critical transition detector may output a value of K (a constant) which then may be used to scale the pulse generated by pulse generator 530. By way of a non-limiting example, multipliers 542 and 544 may multiply I and Q components output by pulse generator 530 to dynamically scale an amplitude of the pulse generated by pulse generator 530.

In an alternative embodiment, pulse attributes logic module 560 may compute the height of the peaks or nulls of the depths of at least two successive symbols input to it and compute a value of K from that. For example, by comparing the attributes of successive input symbols (S(N−I) ... S(N−1), S(N), S(N+1) ... S(N+i)) pulse attributes logic module 560 may dynamically generate an appropriate value of K 540. Pulse attributes logic module 560 may also determine a timing of application of the pulse and a shape of the pulse.

Critical transition detector 510 may use a look-up table 520 to determine when a particular transition is labeled as a critical transition. By way of a non-limiting example, a transition from one phase to another may be labeled as critical when a transition results in a pass through the middle of constellation diagram 600 shown in FIG. 6. Thus, for example, a transition from constellation point 610 to 650 may be identified as a critical transition.

Figure 7:
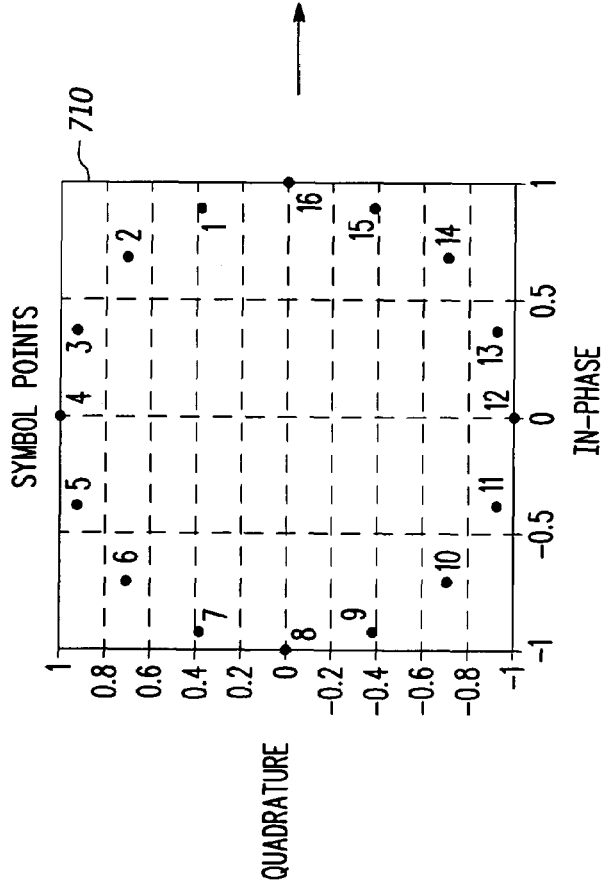
FIG. 7 shows another exemplary constellation points diagram and an exemplary look-up table.

Referring now to FIG. 7, another exemplary constellation point diagram and an exemplary look-up table are shown. As illustrated in exemplary constellation point diagram 710, information may be conveyed using a 8-PSK modulation scheme. Thus, consistent with the embodiments of the invention, constellation point diagram 710 shows 16 constellation points, each of which represents a symbol, for example. Additionally, FIG. 7 shows an exemplary look-up table 720 that includes information concerning a weighting factor for an in-phase and a quadrature component of a pulse that could be generated in response to detection of a critical transition. Various fields in exemplary look-up table 720 may include transition 722, I-weight 724, and Q-weight 726. Transition 722 may include a set of possible critical transitions for a particular linear modulation technique. By way of a non-limiting example, table 720 shows critical transitions for a 8-PSK modulation scheme. I-weight 724 may include a weighting factor (a relative or an absolute value or amplitude, for example) corresponding to an in-phase component of a pulse to be generated by pulse generator 530, for example. Q-weight 726 may include a weighting factor corresponding to a quadrature component of a pulse to be generated by pulse generator 530, for example. Look-up table 720 is merely exemplary, and it may contain additional fields. In addition, information stored in look-up table 720 may be stored in different tables, databases, programs, or other data structures.

Figure 8:
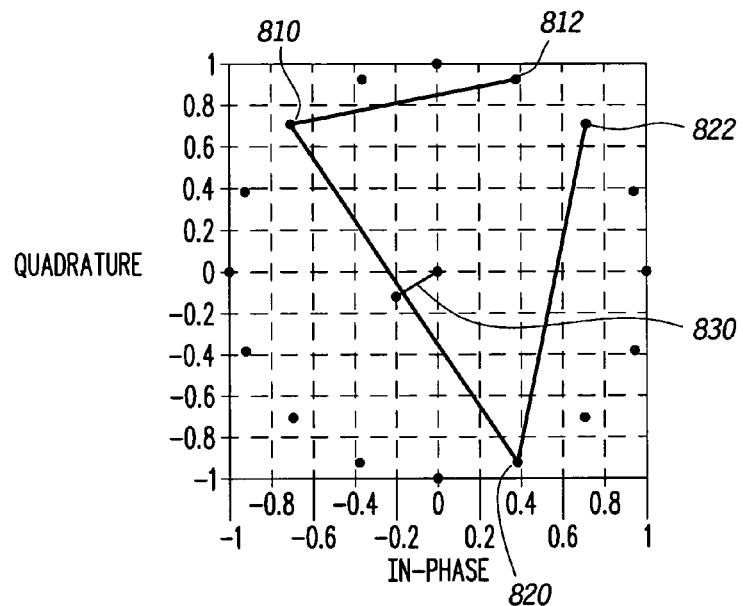
FIG. 8 is a diagram showing exemplary transitions, consistent with embodiments of the invention.

FIG. 8 is a diagram showing critical transitions and the amplitude and angle of a pulse. By way of a non-limiting example, FIG. 8 shows a critical transition from a constellation point 810 to another constellation point 820 for a 8-PSK Enhanced Data Rates Through GSM Evolution (EDGE) modulation based system. For this particular type of modulated waveform, since the symbol phase with the largest variance (i.e., the highest peaks and deepest nulls) is exactly half-way between adjacent symbols, a pulse 830 generated in response to the detection of the critical transition may be applied exactly half-way between adjacent symbols. Pulse 830 may also be applied at a particular angle and may have a certain amplitude. Referring again to FIG. 8, for the example shown, the angle of the applied pulse may be orthogonal to the angle of transition. In this way, pulse insertion logic module 310 (FIG. 3) may cause the modulated waveform to approximate a signal with a reduced peak-to-null requirement. Consistent with embodiments of the invention, information concerning other transitions, for example from 812 to 810 and from 820 to 822 may also be used in determining the angle, amplitude, and shape of the pulse to be generated. Similar pulses may be used with any other modulated waveform for which the signal's probability distribution function is constant for each phase of the symbol period. Exemplary pulses may exhibit a strong main lobe, pass little energy through a bandpass filter (such as EDGE measurement filter), pass output radio frequency spectrum at a desired operating point, require little time support, and/or efficiently limit nulls in the modulated waveform.

Figure 9:
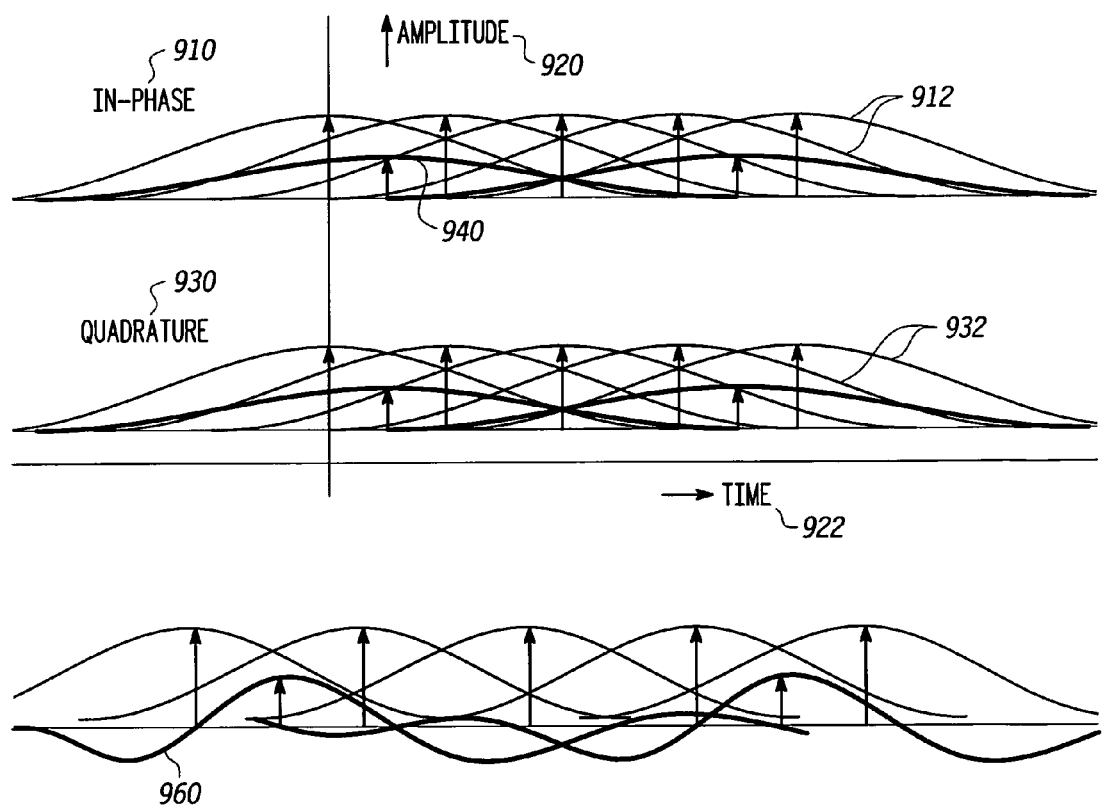
FIG. 9 is a diagram showing exemplary modulated waveforms and pulses, consistent with embodiments of the invention.

FIG. 9 shows various modulated waveforms and pulses consistent with various embodiments of the invention. By way of illustration, in-phase 910 and quadrature 930 components of a modulated waveform representing a symbol stream, for example, are shown. Amplitude 920 (and/or phase) of these components, for example, may vary with time 922. Waveforms 912 illustrate the in-phase component and waveforms 932 illustrate the quadrature component. Pulse 940 is shown as being generated with an amplitude, timing, and shape that may result in reduction of peak-to-power requirements of a power amplifier, which may be used to amplify waveforms 912 and 932. Various shapes of pulses may be used consistent with the embodiments of the invention. Thus, for example pulse 960 may be used, as well.

Figure 10:
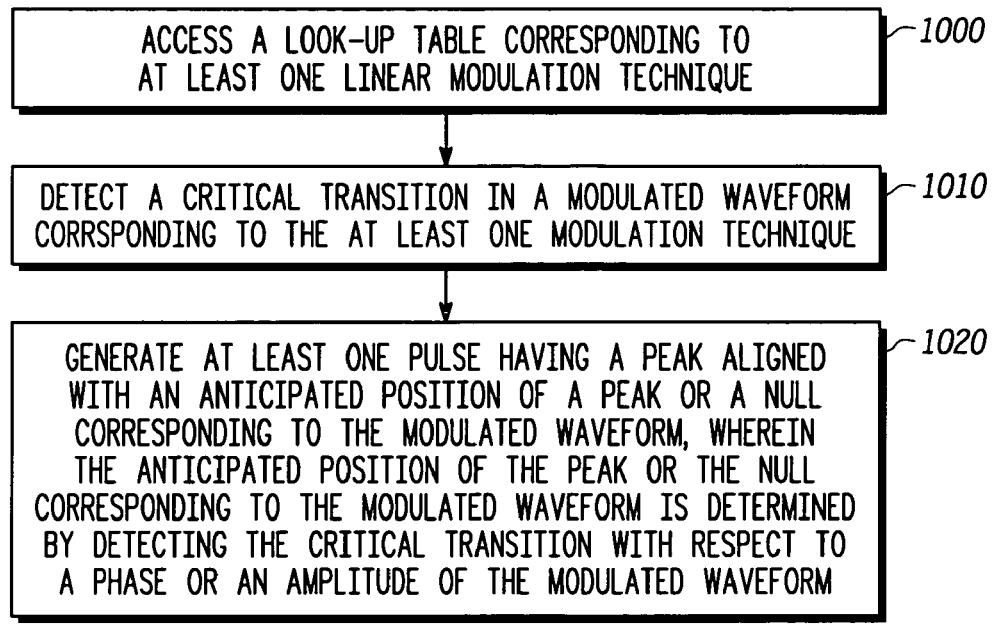
FIG. 10 is a flow chart of an exemplary method for generating a pulse, consistent with embodiments of the invention.

FIG. 10 is a flow chart of an exemplary method for generating a pulse, consistent with one embodiment of the invention. The exemplary method may include accessing a look-up table corresponding to at least one linear modulation technique (step 1000). By way of example, critical transition detector 510 (FIG. 5) may access look-up table 520 (FIG. 5). Consistent with various embodiments of the invention, several look-up tables may be stored; one each for a particular linear modulation technique.

The method may further include detecting a critical transition in a modulated waveform corresponding to the at least one modulation techinique (step 1010). By way of example, critical transition detector 510 (FIG. 5) may detect the critical transition when CR bit is set to 1 as explained above with respect to FIGS. 4 and 5.

The exemplary method may further include generating at least one pulse having a peak aligned with an anticipated position of a peak or a null corresponding to the modulated waveform, wherein the anticipated position of the peak or the null corresponding to the modulated waveform is determined by detecting the critical transition with respect to, a phase and an amplitude of the modulated waveform (step 1020). By way of example, pulse generator 530 (FIG. 5) may generate the pulse based on whether CR bit is 1 or 0, as explained above with respect to FIGS. 4 and 5. Moreover, as explained above with respect to FIGS. 4 and 5 an amplitude and an angle of the at least one pulse may be dynamically generated.

Figure 11:
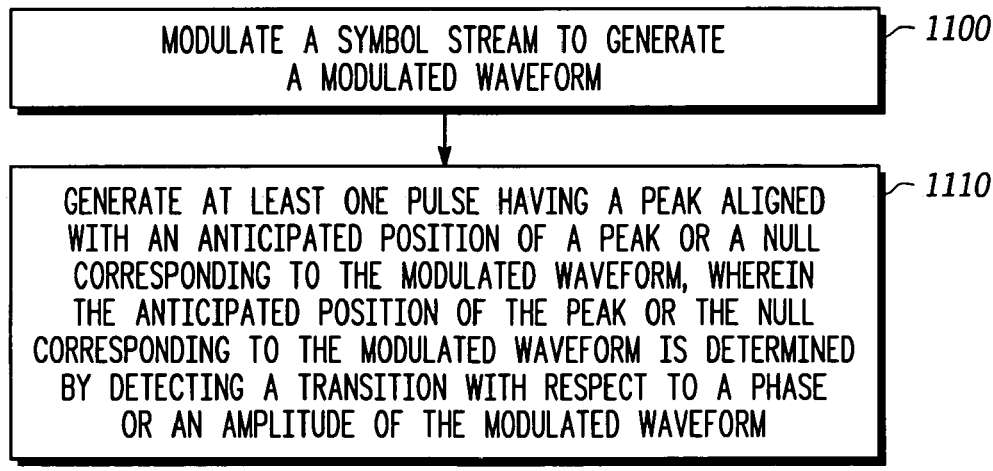
FIG. 11 is a flow chart of another exemplary method for generating a pulse, consistent with embodiments of the invention.

FIG. 11 is a flow chart of another exemplary method for generating a pulse, consistent with an embodiment of the invention. The exemplary method may include modulating a symbol stream to generate a modulated waveform (step 1100). By way of example, modulator 204 of FIG. 3 may be used to modulate the symbol stream to generate the modulated waveform.

The exemplary method may further include generating at least one pulse having a peak aligned with an anticipated position of a peak or a null corresponding to the modulated waveform, where the anticipated position of the peak or the null corresponding to the modulated waveform may be determined by detecting a transition in a phase or an amplitude of the modulated waveform (1110). By way of example, pulse insertion logic module 310 may detect the transition. Upon detecting the transition, pulse insertion logic module 310 may communicate with a pulse generator, such as pulse generator 530 of FIG. 5 to generate the at least one pulse.

The method may further include determining a timing of an application of the at least one pulse to the modulated waveform. In one embodiment, the at least one pulse may be applied exactly half-way between adjacent symbols. The method for generating at least one pulse may further include determining an amplitude and/or a shape of the at least one pulse. The shape and the amplitude of the pulse may be determined in advance of the generation of the pulse. Alternatively, either or both the shape and the amplitude may be determined after detection of the critical transition during processing of the modulated waveform, for example. By way of example, the pulse may have a direction orthogonal to a direction of a transition from a first constellation point to a second constellation point corresponding to the modulated waveform (as shown in FIG. 8, for example). Moreover, the amplitude of the pulse may be selected to minimize a height of the peak of the modulated waveform and/or to minimize a depth of the null of the modulated waveform.

Although the present invention has been described in detail, it will be apparent to those skilled in the art that the invention may be embodied in a variety of specific forms and that various changes, substitutions and alterations can be made without departing from the spirit and scope of the invention. The described embodiments are only illustrative and not restrictive and the scope of the invention is, therefore, indicated by the following claims.

The invention claimed is:

1. A method for generating a pulse, the method comprising:
   modulating a symbol stream to generate a modulated waveform; and
   generating at least one pulse having a peak aligned with an anticipated position of a peak or a null corresponding to the modulated waveform, wherein the anticipated position of the peak or the null corresponding to the modulated waveform is determined by detecting a transition in a phase or an amplitude of the modulated waveform, and wherein the transition comprises a transition from a first constellation point to a second constellation point corresponding to the modulated waveform and the at least one pulse has a direction substantially orthogonal to the direction of the transition from the first constellation point to the second constellation point.

2. The method of claim 1 further comprising determining a timing of an application of the at least one pulse to the modulated waveform.

3. The method of claim 2 further comprising determining an amplitude of the at least one pulse.

4. The method of claim 3 further comprising determining a shape of the at least one pulse.

5. The method of claim 4, wherein each of the timing of the application, the amplitude, and the shape of the at least one pulse are determined in advance of the generating of the at least one pulse.

6. The method of claim 1, wherein the at least one pulse is generated in response to detection of the transition in the phase or the amplitude of the modulated waveform by a pulse insertion logic module arranged in parallel to a waveform logic module configured to modulate the symbol stream.

7. The method of claim 6 further comprising delaying the symbol stream being processed by the pulse insertion logic module by at least one symbol length in relation to the symbol stream being processed by the waveform logic module.

8. The method of claim 1, wherein the at least one pulse has an amplitude selected to at least minimize a height of the peak of the modulated waveform or minimize a depth of the null of the modulated waveform.

9. The method of claim 1, wherein an amplitude and an angle of the at least one pulse is dynamically generated.

10. A wireless device comprising:
    a waveform logic module for modulating a symbol stream to generate a modulated waveform based on at least one modulation technique;

a pulse insertion logic module for detecting a critical transition in the modulated waveform corresponding to the at least one modulation technique; and a pulse generator for generating at least one pulse having a peak aligned with an anticipated position of a peak or a null corresponding to the modulated waveform, wherein the anticipated position of the peak or the null corresponding to the modulated waveform is determined by the pulse insertion logic by detecting the critical transition with respect to a phase or an amplitude of the modulated waveform, and wherein the anticipated position corresponds to a point substantially half-way between a current constellation point and a next constellation point.

11. The wireless device of claim 10, wherein the pulse insertion logic module further comprises a memory for storing a look-up table.

12. The wireless device of claim 10, wherein the at least one pulse is characterized by an amplitude, a shape, and a timing designed to reduce dynamic range requirements of a power amplifier configured to amplify the modulated waveform.

13. The wireless device of claim 10, wherein the pulse insertion logic module is arranged in parallel to the waveform logic module.

14. The wireless device module of claim 10 further comprising a delay module for delaying the symbol stream being processed by the pulse insertion logic module by at least one symbol length in relation to the symbol stream being processed by the waveform logic module.

15. The wireless device of claim 10, wherein each of a timing of the application, an amplitude, and a shape of the at least one pulse is determined in advance of the generating of the at least one pulse.

16. A wireless device comprising:

a waveform logic module for modulating a symbol stream to generate a modulated waveform;

a critical transition detector for detecting a critical transition in the modulated waveform, wherein the critical transition detector accesses a look-up table storing information concerning at least one set of critical transitions related to the modulated waveform, wherein the set of critical transitions comprises at least one transition from a first constellation point to a second constellation point corresponding to the modulated waveform, such that the at least one transition passes near a center or a periphery of the center of a constellation diagram corresponding to the modulated waveform; and a pulse generator for generating at least one pulse having a peak aligned with an anticipated position of a peak or a null corresponding to the modulated waveform.

17. The wireless device of claim 16, wherein the at least one pulse is characterized by an amplitude, a shape, and a timing designed to reduce dynamic range requirements of a power amplifier configured to amplify the modulated waveform.

18. The wireless device of claim 16, wherein the critical transition detector is arranged in parallel to the waveform logic module.

19. The wireless device module of claim 16, wherein the at least one pulse has an angle orthogonal to a direction of the transition from the first constellation point to the second constellation point.

20. The wireless device of claim 16 further comprising a pulse attributes logic module for dynamically generating an amplitude and an angle of the at least one pulse.

\* \* \* \* \*

UNITED STATES PATENT AND TRADEMARK OFFICE
CERTIFICATE OF CORRECTION

PATENT NO.        : 7,469,020 B2                                       Page 1 of 1
APPLICATION NO.   : 11/114366
DATED             : December 23, 2008
INVENTOR(S)       : McCoy et al.

It is certified that error appears in the above-identified patent and that said Letters Patent is hereby corrected as shown below:

On the title page, second column

Please change the Examiner data from:

*Primary Examiner:* Kabir A Timory

To this:

*Primary Examiner:* Shuwang Liu
*Assistant Examiner:* Kabir A Timory

Signed and Sealed this

Twentieth Day of October, 2009

David J. Kappos
*Director of the United States Patent and Trademark Office*